(12) United States Patent
Elbrandt et al.

(10) Patent No.: US 11,155,446 B2
(45) Date of Patent: Oct. 26, 2021

(54) METHOD FOR INSTALLING OR UNINSTALLING A COMPONENT OF A WIND TURBINE

(71) Applicant: Siemens Gamesa Renewable Energy A/S, Brande (DK)

(72) Inventors: Jacob Skjold Elbrandt, Herning (DK); Henning Sahl Helsager, Herning (DK)

(73) Assignee: SIEMENS GAMESA RENEWABLE ENERGY A/S

(*) Notice: Subject to any disclaimer, the term of this patent is extended or adjusted under 35 U.S.C. 154(b) by 169 days.

(21) Appl. No.: 16/605,831

(22) PCT Filed: Jan. 8, 2018

(86) PCT No.: PCT/EP2018/050365
§ 371 (c)(1),
(2) Date: Oct. 17, 2019

(87) PCT Pub. No.: WO2018/192687
PCT Pub. Date: Oct. 25, 2018

(65) Prior Publication Data
US 2020/0122984 A1    Apr. 23, 2020

(30) Foreign Application Priority Data
Apr. 18, 2017 (DE) .................... 10 2017 206 531.1

(51) Int. Cl.
*B66C 23/18* (2006.01)
*F03D 80/50* (2016.01)
(Continued)

(52) U.S. Cl.
CPC ............ *B66C 23/185* (2013.01); *B66C 13/08* (2013.01); *F03D 13/40* (2016.05); *F03D 80/50* (2016.05);
(Continued)

(58) Field of Classification Search
CPC . B66C 1/108; B66C 23/185; B66C 13/04–06; B66C 13/08; F05B 2230/61;
(Continued)

(56) References Cited

U.S. PATENT DOCUMENTS 3,900,114 A * 8/1975 Inoue .................. B66C 13/06
212/83
5,186,342 A * 2/1993 Shimizu ............... B66C 13/06
212/274
(Continued)

FOREIGN PATENT DOCUMENTS

CN      201191238 Y     2/2009
CN      201686394 U     12/2010
(Continued)

OTHER PUBLICATIONS

International Search Report and the Written Opinion of the International Searching Authority dated Apr. 16, 2018 for Application No. PCT/EP2018/050365.
(Continued)

*Primary Examiner* — Matthew P Travers
(74) *Attorney, Agent, or Firm* — Schmeiser, Olsen & Watts LLP

(57) ABSTRACT

Provided is a method for installing or uninstalling a component of a wind turbine, which component is moved with a lifting device at which the component is fixed with cables, whereby two ropes are fixed to the component, with each rope running to a winch attached at a previously installed component of the wind turbine, with the ropes crossing each other and being moved around the winches for tensioning the rope while the component is lowered to its installation position or is lifted from its installation position.

17 Claims, 7 Drawing Sheets

(51) Int. Cl.
*B66C 13/08* (2006.01)
*F03D 13/40* (2016.01)
*B66C 1/10* (2006.01)

(52) U.S. Cl.
CPC ...... *B66C 1/108* (2013.01); *B66D 2700/0183* (2013.01); *F05B 2230/61* (2013.01)

(58) Field of Classification Search
CPC .............. F05B 2230/60; F05B 2230/70; F05B 2230/80; F03D 13/10; F03D 13/40; F03D 80/50; B66D 2700/0183
See application file for complete search history.

(56) References Cited

U.S. PATENT DOCUMENTS

| | | | | |
|---|---|---|---|---|
| 6,568,712 | B1 * | 5/2003 | Aaron, III | B23K 37/0533 |
| | | | | 285/24 |
| 2013/0323007 | A1 | 12/2013 | Falkenberg | |
| 2014/0237932 | A1 * | 8/2014 | Moestrup | E04H 12/085 |
| | | | | 52/651.01 |
| 2014/0246634 | A1 * | 9/2014 | Kusian | B66D 1/7436 |
| | | | | 254/323 |
| 2014/0360015 | A1 * | 12/2014 | Lohan | B66C 23/207 |
| | | | | 29/889.1 |
| 2017/0129749 | A1 * | 5/2017 | Rodr Guez Mijangos | ............ |
| | | | | B66C 13/08 |
| 2018/0029849 | A1 * | 2/2018 | Beer | B66C 13/08 |

FOREIGN PATENT DOCUMENTS

| | | | | |
|---|---|---|---|---|
| CN | 201729604 U | 2/2011 | | |
| CN | 102782311 A | 11/2012 | | |
| CN | 103452769 A | 12/2013 | | |
| DK | 2084098 T3 | 3/2011 | | |
| EP | 3653873 A1 * | 5/2020 | ............ | F03D 13/40 |
| JP | 2016074524 A | 5/2016 | | |
| JP | 2016210607 A | 12/2016 | | |
| KR | 20160006561 A | 1/2016 | | |
| WO | 2011110254 A2 | 9/2011 | | |
| WO | 2015165463 A1 | 11/2015 | | |

OTHER PUBLICATIONS

Non-English Chinese Office Action for Application No. 201880026141.7, dated Apr. 13, 2020.

* cited by examiner

METHOD FOR INSTALLING OR UNINSTALLING A COMPONENT OF A WIND TURBINE

CROSS-REFERENCE TO RELATED APPLICATIONS

This application claims priority to PCT Application No. PCT/EP2018/050365, having a filing date of Jan. 8, 2018, which is based off of EP Application No. 10 2017 206 531.1, having a filing date of Apr. 18, 2017, the entire contents both of which are hereby incorporated by reference.

FIELD OF TECHNOLOGY

The following relates to a method for installing or uninstalling a component of a wind turbine, which component is moved with a lifting device at which the component is fixed with cables.

BACKGROUND

Building a wind turbine involves the installation of several separate components which usually need to be lifted by a lifting device like a crane. Also when uninstalling a turbine component a lifting device is necessary.

A problem arises, when the respective component hanging at the lifting device via one or several cables starts to swing or vibrate due to external forces, for example wind or, when working off-shore, the rolling sea which makes the ship moving. These vibrations or movements bear problems especially when the respective component is positioned to be fixed to another, previously installed component. A usual technique is to attach cables or ropes at a component, which are handheld by several workers for stabilizing the component, while it is positioned by the lifting device and the interaction of the workers. This way of stabilizing or controlling the movement of wind turbine components during their installation or uninstallation is very effortful for the workers trying to control or stabilize a movement and can provide a control only to a certain extend. This situation is unsatisfying.

SUMMARY

An aspect relates to provide an improved method for installing or uninstalling components of a wind turbine with a better stabilization of the component.

For solving the problem embodiments of the invention provides a method, which is characterized in that at least two ropes are fixed to the component, with each rope running to a winch attached at a previously installed component of the wind turbine, with the ropes crossing each other and being moved around the winches for tensioning the rope while the component is lowered to its installation position or is lifted from its installation position.

According to the inventive method the ropes, which are fixed with one end to the component to be installed or uninstalled, run to respective winches, which are firmly attached to a previously installed component. The ropes are guided around the winches and are moved around the winches, while they are kept on tension during the movement of the component. So there is a respective fixed point, i.e. the respective winch, which is entangled by the rope and where the rope is "fixed" in its position, although it is pulled or slackened due to the respective direction of movement for keeping it tensioned.

The inventive guidance of the ropes around the winches makes the lowering or lifting movement more controllable, even if the respective component is somehow unstable due to external forces like wind forces or a movement of the lifting device etc. The component can be guided in a very controllable manner to its final position for installing the component, or can be lifted in a controlled manner when the component is uninstalled.

According to a first embodiment the ropes are manually pulled or slackened when the component is moved. Still the ropes can be manually operated, but this manual operation is easier and less exhaustive for the workers, as the ropes are attached to the winches and entangle them, so that there is a fixed point where any forces resting on the rope are applied to. The worker only needs to pull the rope when the component is lowered, or to slacken the rope when it is lifted. The winch itself comprises for example a wheel which is rotatable by means of a bearing, on which wheel the rope is guided. So even if the ropes are still manually operated this operation is easy to be performed by the workers.

Alternatively to the manually operation of the ropes it is possible that the winches are motor driven for moving and tensioning the respective rope. According to this embodiment each winch comprises a motor which rotates the winch respectively the entangled winch wheel on which the rope is guided. By this motor driven movement the rope is pulled or slackened, whatever is needed. The control of the respective motor can be done based on the detection signals of respective sensors, which for example are provided at the respective winch, which sensors for example detect the load resting on the winch, which load corresponds to the tension of the rope. When the load is lowered the rope is less tensioned, so the motor can immediately tension the rope again. When the load rises the rope is slackened via the motor. So the control of the motors is simple but very precise.

It is already sufficient if only two ropes and two winches are used, as already two ropes allow a sufficient movement control. Nevertheless it is favourable when four ropes and four winches are used, with respective two ropes being attached to opposite sides of the component. According to this embodiment two ropes are attached at a front part and two ropes are attached to a back of the component, with each rope pair crossing each other and running to respective winches attached to different previously installed components. So the component hanging at the cables of the lifting device can be controlled via four ropes and on both ends of the component.

The component to be installed or uninstalled is for example a gear box. This example is not conclusive, as the component to be installed or uninstalled can also be a generator, the main shaft or the like. Nevertheless especially the gear box is a very prominent example. In this case two ropes are running from fixation means or an attachment at the gear box to two winches attached to a generator or a nacelle frame, and/or two ropes are running from fixation means or an attachment at the gear box to two winches attached to a main shaft bearing.

Embodiments of the invention also relates to a lifting arrangement for installing and uninstalling a component of a wind turbine, comprising a lifting device for moving the component which is fixed to the lifting device with cables. The lifting arrangement is characterized in that at least two ropes are fixed to the component, with each rope running to a winch attached at a previously installed component of the wind turbine, with the ropes crossing each other and being moved around the winches for tensioning the rope while the component is lowered to its installation position or is lifted from its installation position.

The lifting device is a crane, which is arranged on the bottom, when the wind turbine is installed on the ground, or which is arranged on a ship when the wind turbine is installed off-shore.

The ropes can either be manually pulled or slackened, when the component is moved, or can be moved by means of a motor. In this case the winches comprise respective motors for driving the winches for moving and tensioning the respective rope.

It is already sufficient if only two ropes and two winches are provided for having a precise movement control of the respective component. In a further embodiment it is possible that four ropes and respective winches are provided, with respective two ropes being attached to opposite sides of the component, so that the component can be movement and position controlled from both sides.

For attaching the ropes to the component shackles can be provided at the component, to which the ropes are fixed. It is also possible to fix the ropes at fixation means or an attachment connecting a cable of the lifting device or a connection cable of the lifting device to a shackle attached to the component. There are obviously several locations and items to which the respective rope can be attached, as long as it is firmly attached to the component.

For fixing the respective winch firmly to the previously installed component each winch is attached to a mounting console fixed to a previously installed component. Each mounting console may comprise a component mounting part fixed to the component and a winch mounting part to which the winch is fixed. The component mounting part comprises for example a base plate, with which is fixed to the component via several bolts or screws, and a respective attachment part to which the winch mounting part is attached. The winch mounting part for example is a longitudinal arm or carrier, with the winch being attached to its end.

According to a exemplary embodiment of the invention the winch mounting part is pivotable and fixable in different orientations relative to the component mounting part. This allows for installing the winch mounting part in an optimized position or orientation depending on the rough direction from which the rope runs to the winch. The component mounting part comprises a receptacle or fixation part for attaching the winch mounting part. For example two fixation plates are provided, between which fixation plates the longitudinal carrier-like winch mounting part is positioned. The fixation plates are provided with respective mounting hole pairs, also the winch carrier comprises at least one bore. A sufficiently long bolt is guided through the plate holes and the bore, with the respective orientation depends on in which hole pair the bolt is inserted. In this way maybe three, four or five respective orientations can be chosen.

Furthermore guide consoles can be attached to a previously installed component for interacting with the component to be installed while lowering the component to its mounting position. With these guide consoles the component is guided to its final mounting position. A guide console may comprise a base plate and a guide plate extending from the base plate in an angle between 100-170°, especially between 120-150°.

For adjusting the height of the guide console one or more shim plates can be arranged below the base plate, on which shim plates the base plate is positioned.

The component to be installed or uninstalled maybe a gear box or a generator or the like. In case a gear box is installed the ropes run from respective fixation means or an attachment at the gear box to two winches attached to a generator or a nacelle frame and/or two ropes run from fixation means or an attachment at the gear box to two winches attached to the main shaft bearing.

BRIEF DESCRIPTION

Some of the embodiments will be described in detail, with reference to the following figures, wherein like designations denote like members, wherein.

DETAILED DESCRIPTION

Figure 1:
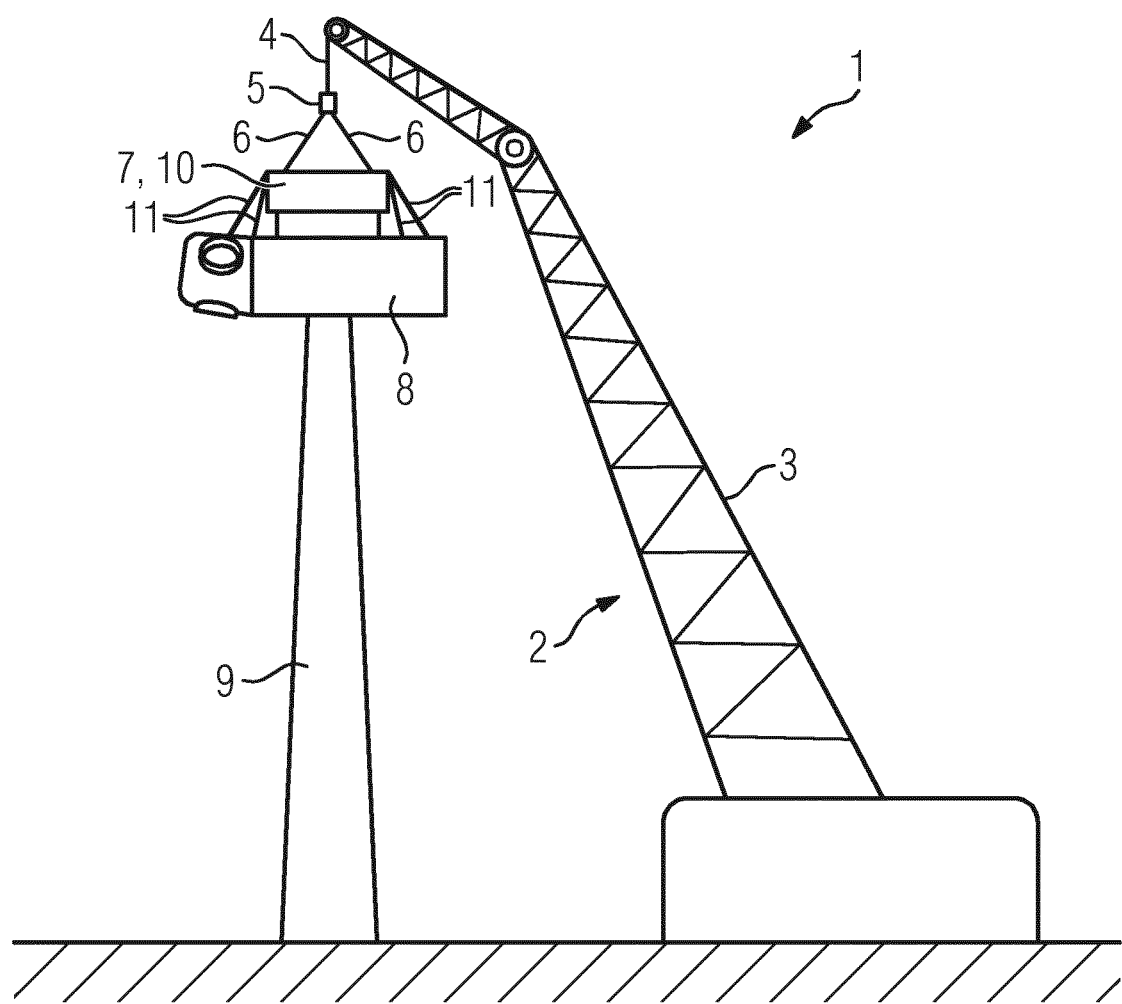
FIG. 1 shows an inventive lifting arrangement.

FIG. 1 shows an inventive lifting arrangement 1 comprising a lifting device 2, here a crane 3. The lifting device 2 comprises at least one cable 4, to which a fixation means or an attachment 5, for example a hook or a frame, is attached. The fixation means or an attachment 5 is connected via further cables 6 to the component 7 which is to be installed within a nacelle 8 already mounted on a tower 9. The component 7, for example a gear box 10, is secured via four ropes 11 which are attached to the component 7 and to respective winches not shown in FIG. 1.

FIG. 1 is a principle sketch. Certainly the set up for attaching the respective component 7 to the lifting device 2 may comprise several other components like a handling tool 10, for example a handling yoke or handling frame or the like. Also the component 7 shown as a gear box 10 can be another component like a generator, a main shaft or the like.

Figure 2:
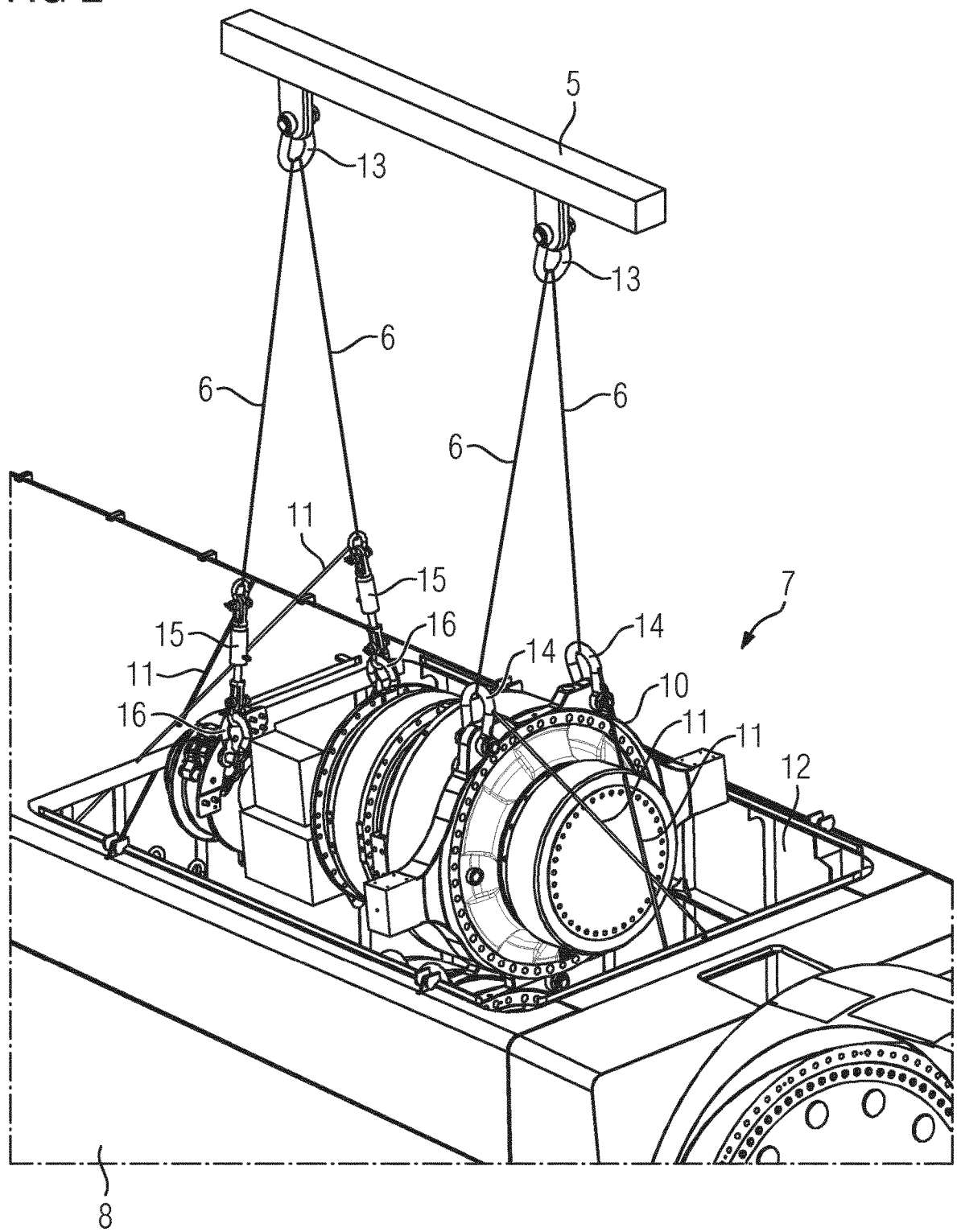
FIG. 2 shows a component hanging on the lifting device being lowered into the nacelle and being secured by means of four ropes, in a perspective view.

FIG. 2 shows a perspective view of the arrangement of FIG. 1 showing the nacelle 8 having a top opening 12 into which the component 7, here the gear box 10, is lowered by means of the crane 3. As can be seen the gear box 10 is attached to the crane 3 via several cables 6, which are fixed to respective shackles 13 which are for example provided at the fixation means or an attachment 5. The cables 6 are fixed to respective shackles 14 arranged at the front side of the gear box 10 and to respective fixation means or an attachment 15 connecting the cables 6 to the respective shackles 16 at the other side of the gear box 10.

Attached to the shackles 14 two ropes 11 are shown, which ropes 11 cross each other as can be seen in FIG. 2. On the other side of the gear box 10 two further ropes 11 are attached to the respective fixation means or an attachment 15, with also these ropes 11 crossing each other.

Figure 3:
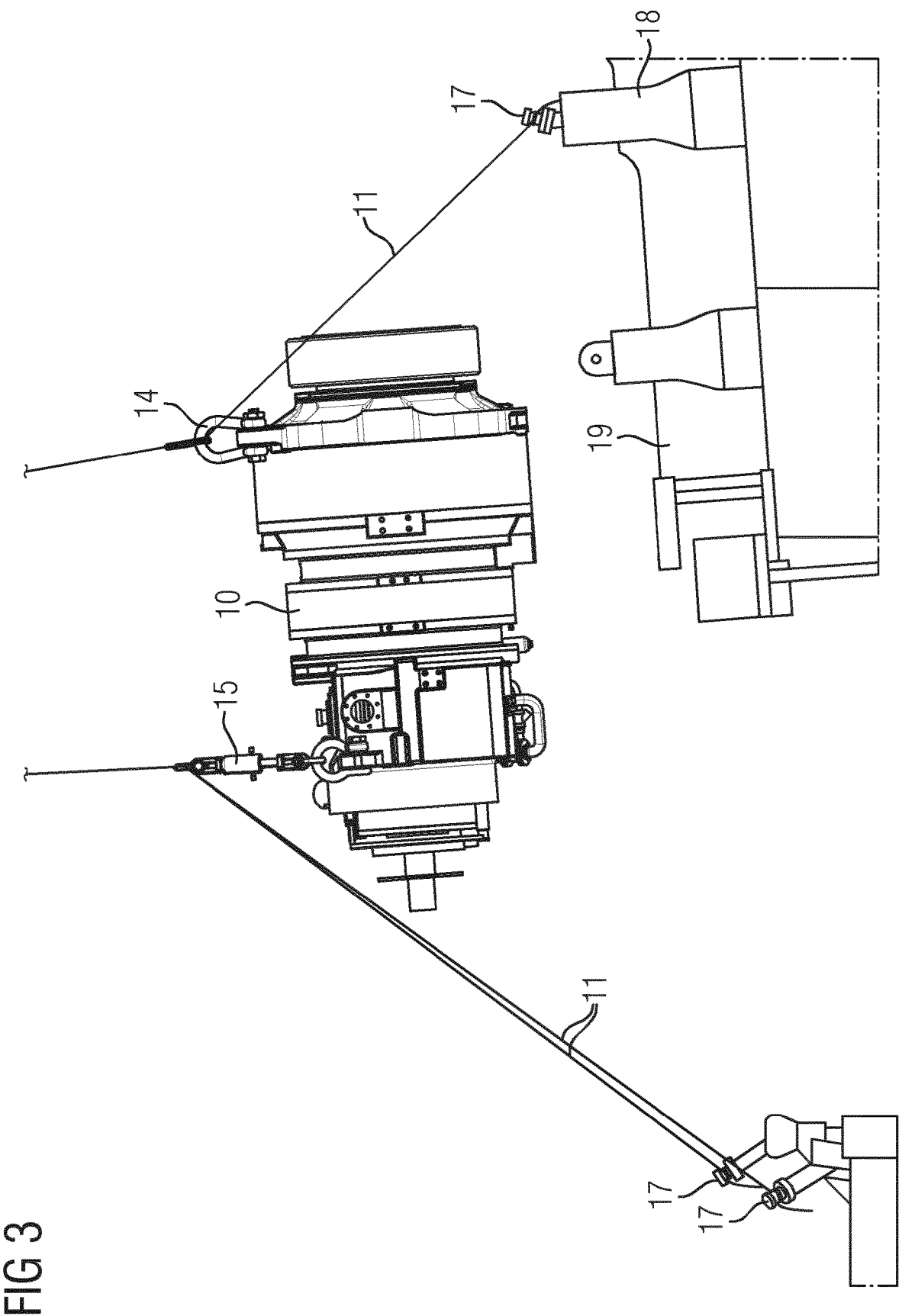
FIG. 3 shows the relevant items of the arrangement according to FIG. 2 in a side view.

The respective pairs of ropes 11 run to respective winches 17, see for example FIG. 3 showing a side view of the arrangement of FIG. 2.

The winches 17 shown on the right side of FIG. 3 are attached to the main bearing 18 of the main shaft 19, which components are already installed. The gear box 10 shall be attached to the main shaft 19, it therefore needs to be lowered and positioned relative to the main shaft 19.

Figure 4:
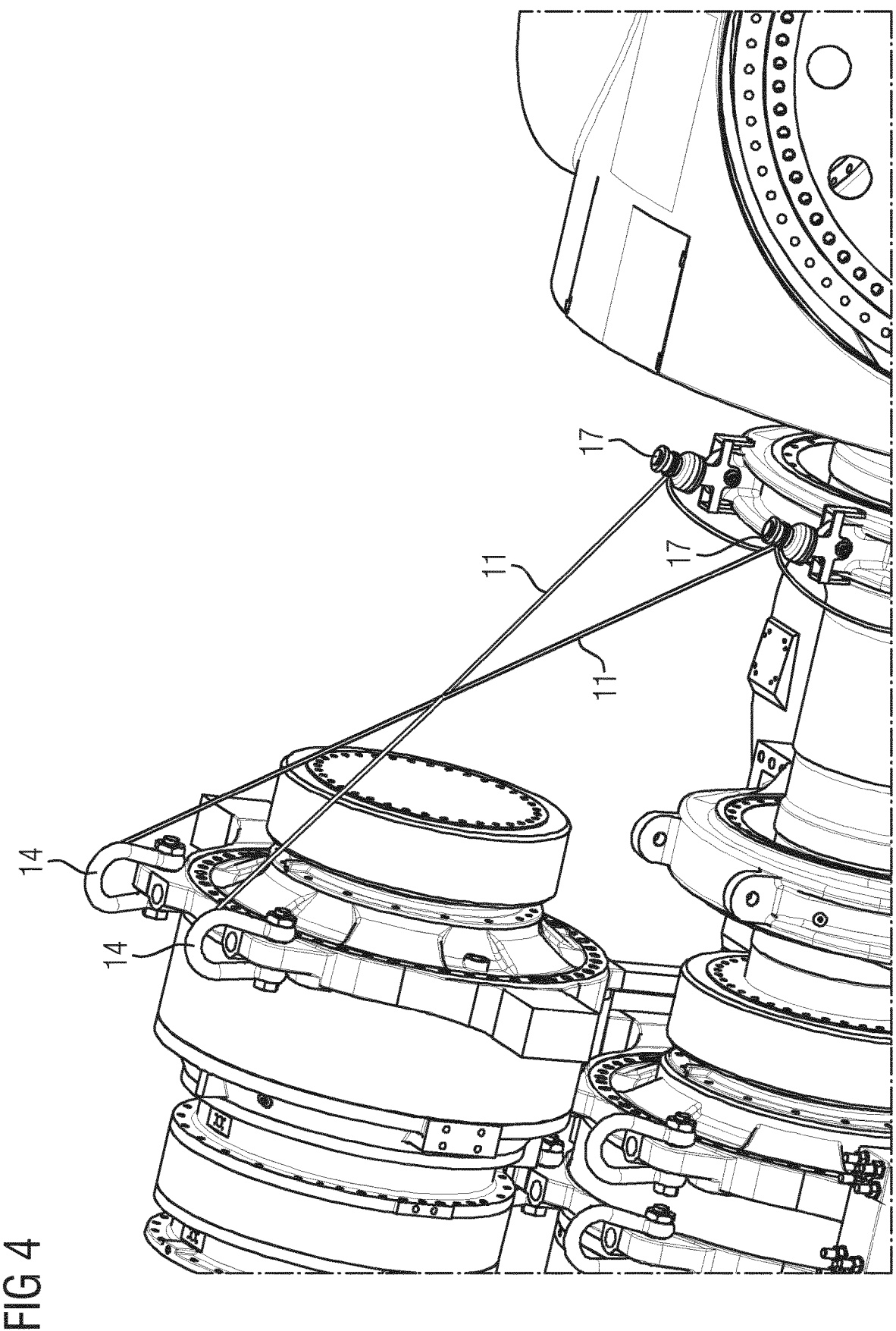
FIG. 4 shows an enlarged perspective view of two stabilization ropes attached to the component and two winches.
Figure 5:
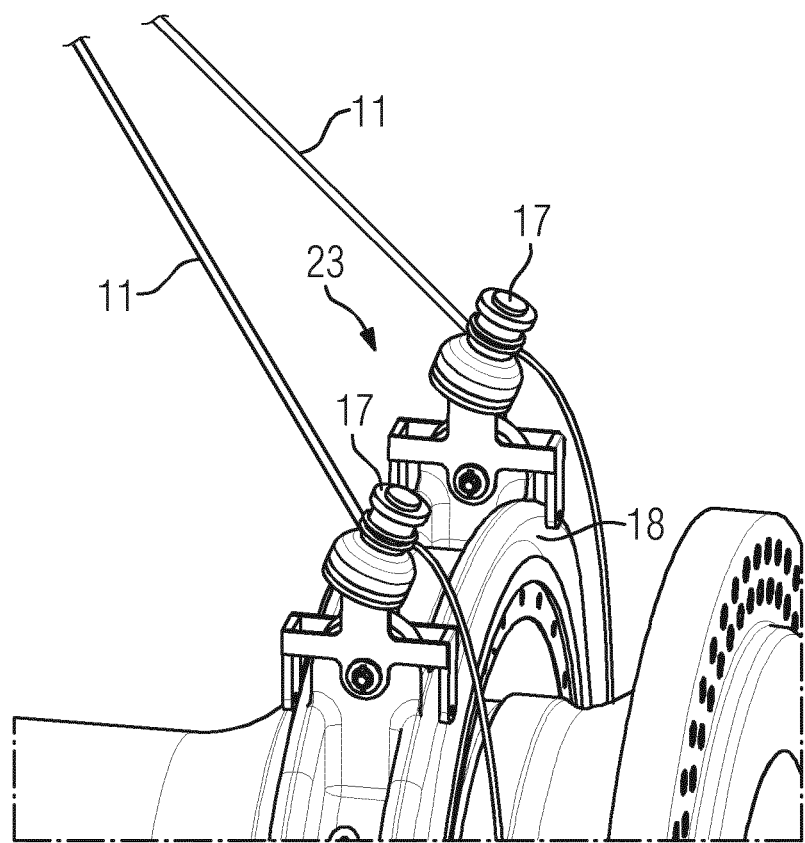
FIG. 5 shows an enlarged view of the two winches of FIG. 4 arranged at the main shaft bearing.

As can be clearly seen in FIG. 4 the two ropes 11 cross each other when running from the respective shackles 14 to the respective winches 17. They entangle the winches one or several times, their free end is hanging loosely from the winches 17. This free end can be handheld by a worker and can be pulled for tensioning the respective rope 11, when the gear box 10 is lowered for keeping the respective rope 11 on tension between the fixation point at the shackle 14 and the fixation point at the winch 17, or it can be slackened when the distance between the gear box 10 and the respective winch 17 rises. As is shown in FIGS. 4 and 5 the respective winches 17 are firmly fixed to the respective main bearing 18, so that the respective load from the ropes 11 can be taken by the winches 17.

Figure 6:
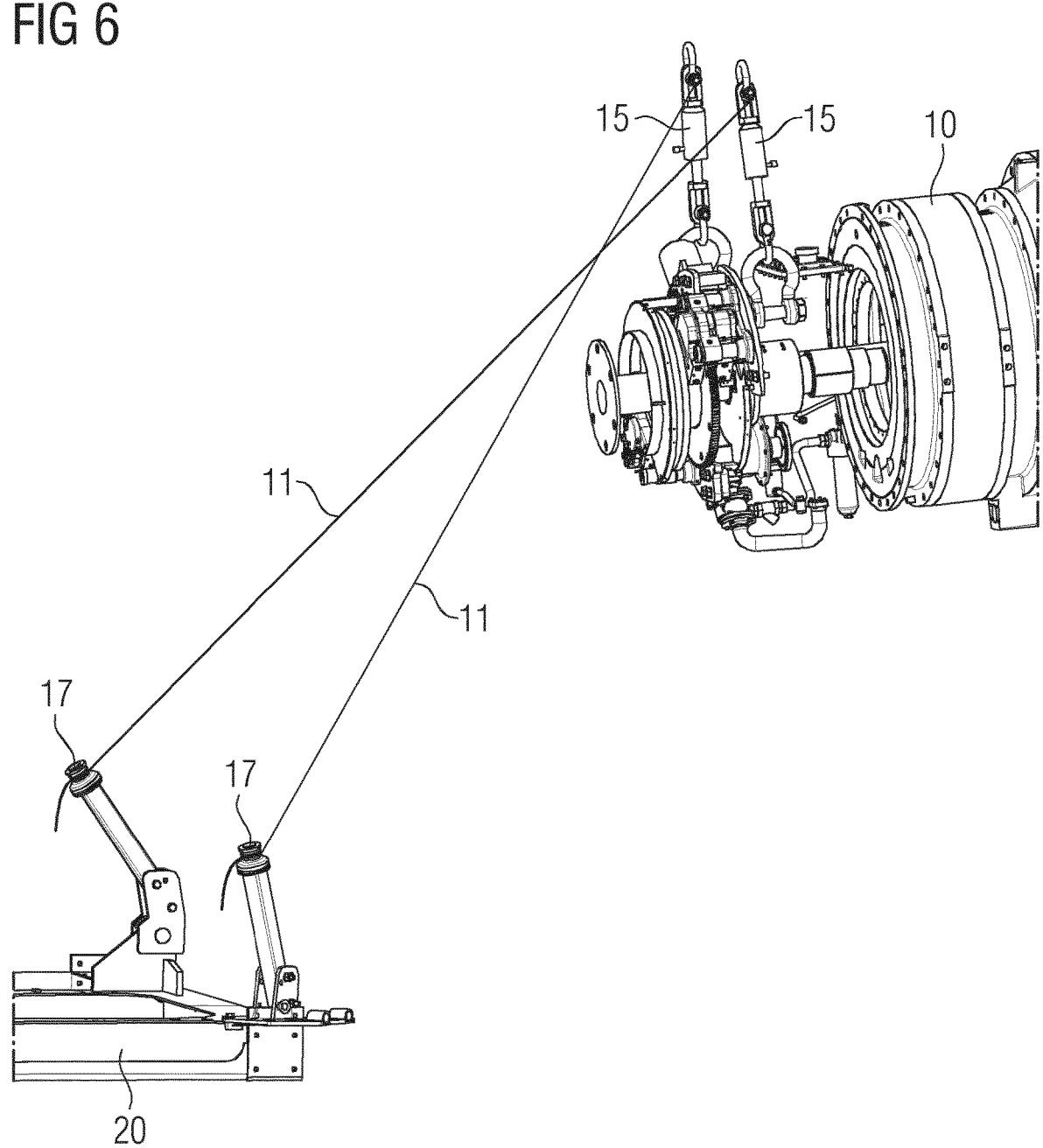
FIG. 6 shows a perspective view of the other side of the component according to FIG. 4 with two ropes crossing each other and being secured to two winches attached next to a not shown generator.

FIG. 6 shows the respective gear box 10 from the other side. The two ropes 11 run from the fixation means or an attachment 15 to two further winches 17 which are attached to a frame 20 for holding a generator, which may for example be installed afterwards. Also these ropes 11 entwine the winches one or several times, their respective ends also hanging free. They can be held by workers for tensioning or slackening the respective rope 11 just as needed for maintaining the tension and fixing the orientation and position of the gear box 10.

Figure 7:
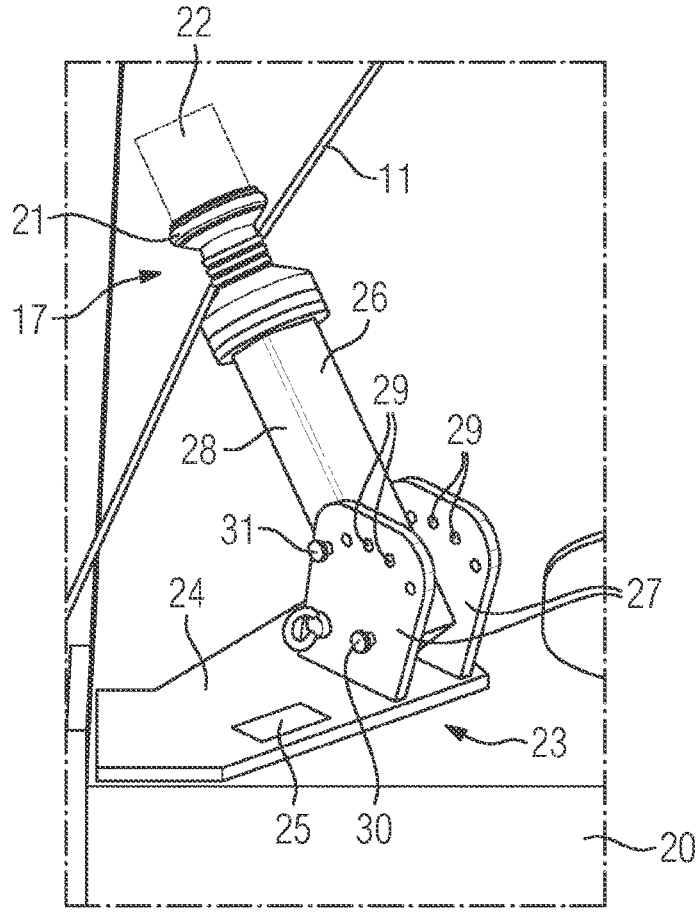
FIG. 7 shows a perspective view of a winch with a mounting console.

FIG. 7 shows an enlarge view of a winch 17. It comprises a wheel 21 which can rotate in both directions. The wheel is rotatable via a not shown bearing. The winch 17 may comprise a motor 22 which is shown as an option by means of the dashed line in FIG. 7 for automatically rotating the winch 17 respectively the wheel 21. This enables an automatic tensioning or slackening operation, for example due to respective measurement values of a load sensor attached to the winch 17 measuring the respective load exerted from the respective rope 11 on the wheel 21, which load is a measure for determining the tension of the rope 11. If such a motor 22 is not installed, the operation is manually performed by the respective worker, who can easily tension or slacken the rope as the rope is fixed at the pivot point realized by the winch 17.

The winch 17 is arranged on a console 23 having a base plate 24 mounted on the respective component like the frame 20. The base plate 24 is part of a component mounting part 25, to which a winch mounting part 26 is pivotably but fixably attached to. The component mounting part 25 comprises two fixation plates 27 between which the winch mounting part 26 realized as a longitudinal carrier 28 is provided. The fixation plates 27 are provided with respective pairs of holes 29, while the carrier 28 is also provided with at least two through bores. In the first bore a first bolt 30 is arranged running through respective holes 29 on the plates 27. This bolt 30 provides a pivot axis.

In the second through bore a second bolt 31 is provided running through a respective pair of holes 29. It is obvious that the carrier 28 can pivot around the pivot axis realized by means of the bolt 30, so that the orientation of the carrier 28 relative to the component mounting part 25 can be changed and adjusted. When the respective orientation is found the bolt 31 is inserted in the respective holes 29 and the through bore for finally fixing the chosen position. The fixation of the respective bolts 30, 31 is realized by means of respective nuts screwed on the bolts 30, 31. With this pivot means or pivot the orientation of the winch 17 relative to the direction from which the respective cable runs the winch can be adjusted before the operation begins.

The mounting console shown in FIG. 7 is only an example. As is obvious from FIG. 5 the respective mounting consoles 23 shown in FIG. 5 used for arranging the respective winches 17 the main bearing 18 are different in their setup to the setup shown in FIG. 7.

In the shown embodiment the respective gear box 10 is fixed and stabilized by four ropes 11 running to respective four winches 17. As the ropes 11 cross each other, and as the ropes are fixed at the gear box 10 and the respective winches 17 the gear box 10 is fixed at eight separate locations while being lowered into the nacelle. This arrangement allows a perfect and seen from its handling point of view simple stabilization of the component 7 respectively the gear box 10 against any movement induced by external forces. This is possible as the ropes 11 can easily be held on tension while the gear box 10 is lowered. It is only necessary for the worker or by automatic operation to keep the respective rope 11 always tensioned, so that any swinging movement of the gear box 10 is prohibited.

Figure 8:
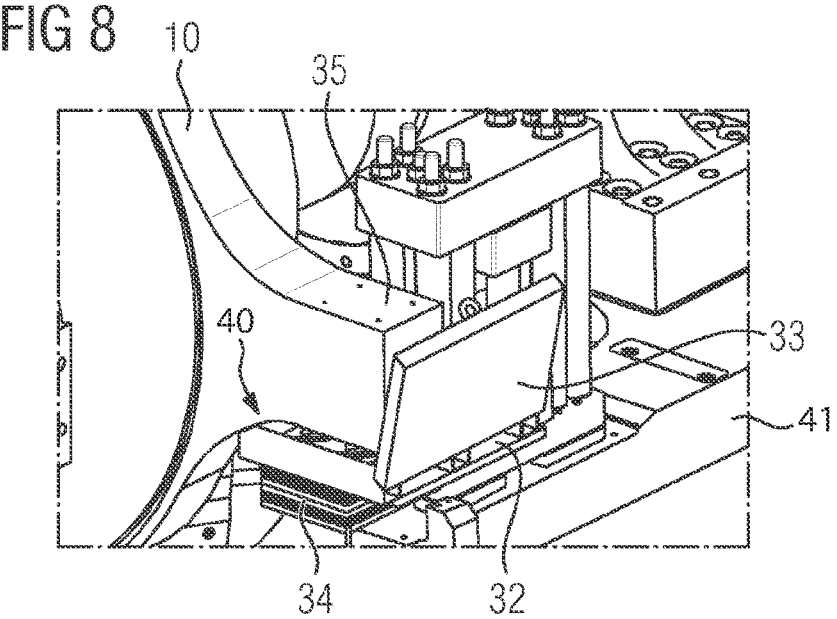
FIG. 8 shows a perspective view of a guide console.

Finally FIG. 8 shows a guiding console 40 attached to a previously installed component 41 for interacting with the gear box 10 while lowering the gear box 10 into its mounting position. The guide console 40 comprises a base plate 32 and a guide plate 33 extending from the base plate 32 in an angle especially between 120-150°. Between the base plate 32 and the previously installed component 41 several shim plates 34 are arranged for adjusting the height of the guide console 40 in view of the final fixation points of the gear box 10. It is obvious that on both sides of the gear box 10 one or several respective guide consoles 40 are arranged.

When lowering the gear box 10 respective guiding extensions 35 abut the respective guide plates 33 and slide along the guide plate 33 until the gear box 10 rests in its final mounting position.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for installing or uninstalling a component of a wind turbine, which wherein the component is moved with a lifting device to which the component is fixed with cables, comprising: fixing at least two ropes to the component, with each rope running to a winch attached at a previously installed component in a nacelle of the wind turbine, with the ropes crossing each other and being moved around the winches for tensioning the ropes, and; one of lowering the component to an installation position of the component or lifting the component from the installation position, wherein the installation position is in the nacelle of the wind turbine.

2. The method according to claim 1, wherein the ropes are manually pulled or slackened when the component is moved.

3. The method according to claim 1, wherein the winches are motor driven for moving and tensioning the respective rope.

4. The method according to claim 1, wherein four ropes and respective winches are used, with two ropes being attached to each of opposite sides of the component.

5. The method according to claim 1, wherein the component to be installed or uninstalled is a gear box.

6. The method according to claim 5, wherein two ropes run from fixation means at the gear box to two winches attached to a generator or nacelle frame and/or wherein two ropes run from fixation means at the gear box to two winches attached to a main shaft bearing.

7. A lifting arrangement for installing and uninstalling a component of a wind turbine, comprising: a component configured to be installed into and/or uninstalled from within a nacelle of the wind turbine; a lifting device for moving the component; cables fixing the component to the lifting device; and at least two ropes fixed to the component, with each rope running to a winch attached at a previously installed component in the nacelle of the wind turbine, with the ropes crossing each other and being moved around the winches for tensioning the ropes while the component is lowered to its installation position or is lifted from its installation position.

8. The lifting arrangement according to claim 7, wherein the ropes are configured to be manually pulled or slackened when the component is moved.

9. The lifting arrangement according to claim 7, wherein the winches are motor driven for moving and tensioning the respective rope.

10. The lifting arrangement according to claim 7, wherein four ropes and respective winches are provided, with two ropes being attached to each of opposite sides of the component.

11. The lifting arrangement according to claim 7, wherein the ropes are fixed to shackles or to fixation means connecting a cable to a shackle attached to the component.

12. The lifting arrangement according to claim 7, wherein each winch is attached to a mounting console attached to a previously installed component of the wind turbine.

13. The lifting arrangement according to claim 12, wherein each mounting console comprises a component mounting part fixed to the component and a winch mounting part to which the winch is fixed.

14. The lifting arrangement according to claim 13, wherein the winch mounting part is pivotable and fixable in different orientations relative to the component mounting part.

15. The lifting arrangement according to claim 7, wherein guide consoles are attached to a previously installed component of the wind turbine for interacting with the component to be installed while lowering the component to its mounting position.

16. The lifting arrangement according to claim 15, wherein the guide console comprises a base plate and a guide plate extending from the base plate at one of an angle between 100-170°, and an angle between 120-150°.

17. The lifting arrangement according to claim 16, wherein one or more shim plates are arranged below the base plate for adjusting a height of the guide console.

* * * * *